May 29, 1951     L. A. STENGEL     2,555,278
PROCESS FOR SEPARATING NITRIC ACID FROM A MIXTURE
CONTAINING NITRIC ACID AND HYDROGEN CHLORIDE
Filed May 6, 1948
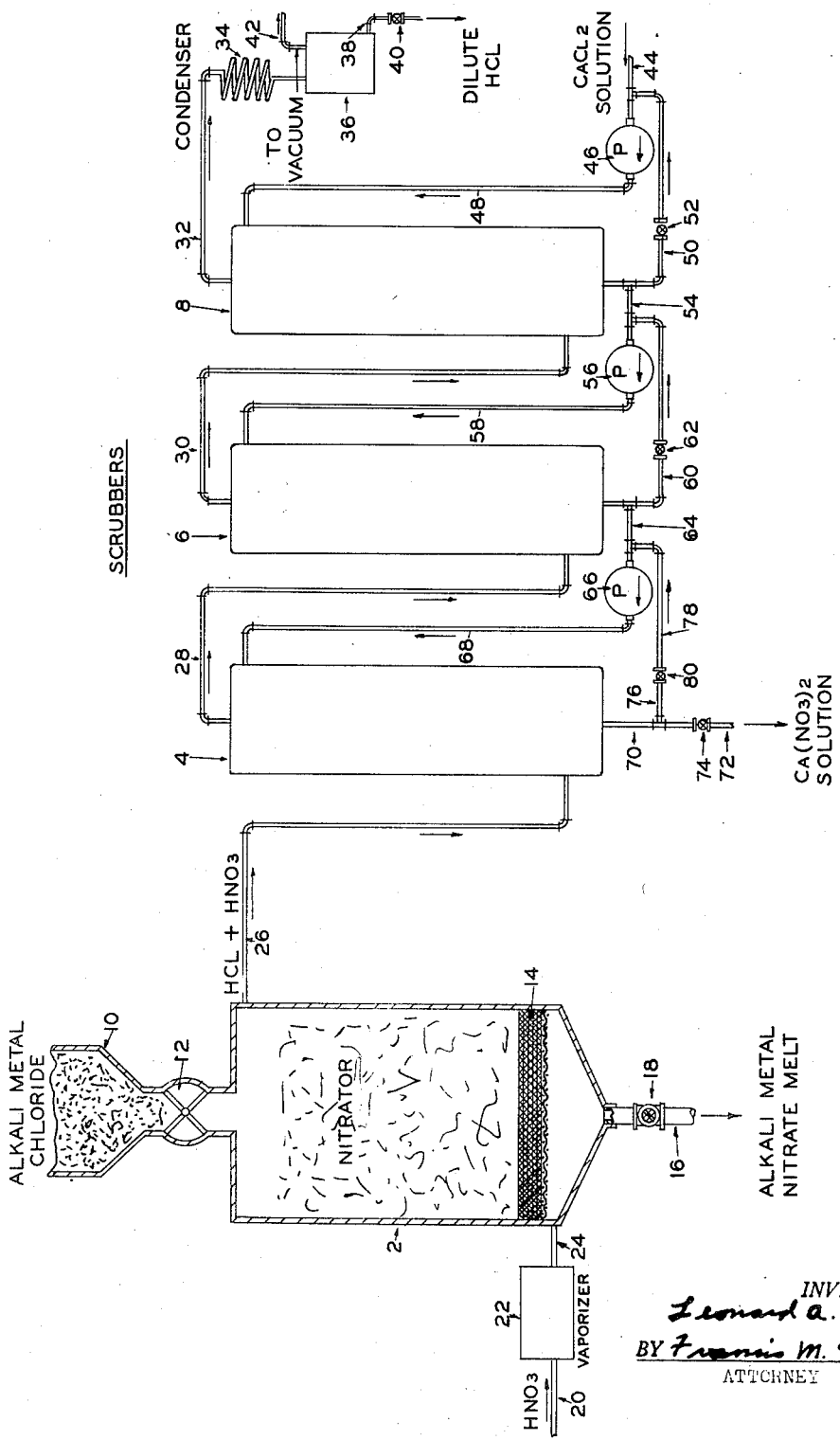
INVENTOR.
Leonard A. Stengel
BY Francis M. Crawford
ATTORNEY Patented May 29, 1951

2,555,278

UNITED STATES PATENT OFFICE 2,555,278

PROCESS FOR SEPARATING NITRIC ACID FROM A MIXTURE CONTAINING NITRIC ACID AND HYDROGEN CHLORIDE

Leonard A. Stengel, Terre Haute, Ind., assignor to Commercial Solvents Corporation, Terre Haute, Ind., a corporation of Maryland Application May 6, 1948, Serial No. 25,378

12 Claims. (Cl. 23—102)

This invention relates to a process for the removal of nitric acid from mixtures containing the same and more particularly to a process for removing nitric acid from a gaseous mixture containing nitric acid and hydrogen chloride.

In a process for the production of alkali metal nitrates by the direct nitration of alkali metal chlorides with nitric acid vapors, there is a gaseous effluent from the reaction zone which contains hydrogen chloride and oxides of nitrogen. In the event that dilute aqueous nitric acid (e. g. 30%) is charged to the nitrator, then under the usual conditions of operation the effluent gas comprises a mixture of hydrogen chloride, nitric acid and water vapor. However, in the event that stronger nitric acid is employed for nitration (e. g. 60%), then the effluent gas may also have contained therein nitrosyl chloride, chlorine and certain gaseous oxides of nitrogen. In a commercially feasible method for effecting the nitration of alkali metal chlorides, it is necessary that utilization be made of the gaseous effluents from the nitrator. Inasmuch as under ordinary operating conditions these gaseous effluents comprises essentially a mixture of water vapors, hydrogen chloride and nitric acid, it is important that these effluents be treated in such a manner as to result in the formation of commercially valuable products. A recovery process of this character ordinarily contemplates the separation of the hydrogen chloride from the nitric acid in the recovery process.

Accordingly it is one object of this invention to provide a process of removing nitric acid from mixtures containing the same.

A further object of this invention is the provision of a process for separating nitric acid from a mixture containing nitric acid and hydrogen chloride.

A further object of this invention is the provision of a process for the treatment of a gaseous mixture containing nitric acid and hydrogen chloride for removing the nitric acid from the mixture.

A still further object of this invention is the provision of a process for separating nitric acid from a vaporous mixture containing nitric acid, hydrogen chloride and water vapor.

A still further object of this invention is the provision of an alkali metal chloride nitration process wherein the nitric acid contained in the effluent gases may be readily separated therefrom.

A still further object of this invention is the provision of a continuous process for separating nitric acid from a vaporous mixture containing nitric acid and hydrogen chloride.

Further and additional objects will appear from the following description, the accompanying drawing and the appended claims.

In accordance with this invention it has been discovered that nitric acid may be separated from a mixture containing the same by contacting the mixture with calcium chloride under conditions controlled to absorb or react the nitric acid and to liberate by vaporization hydrogen chloride that may be formed in the reaction. More specifically, this invention contemplates a process for the treatment of a gaseous mixture containing nitric acid and hydrogen chloride which comprises contacting the mixture in the vapor form with a strong aqueous solution of calcium chloride under conditions to react the nitric acid with the calcium chloride to form calcium nitrate and additional hydrogen chloride, and thereafter separating in the gaseous state the hydrogen chloride from the solution of calcium nitrate that is formed. The gaseous hydrogen chloride which may have substantial amounts of water vapor in admixture therewith may be condensed to produce a commercial grade of dilute hydrochloric acid. The calcium nitrate which may contain a small percentage of residual calcium chloride may be withdrawn from the reaction zone and further purified or it may be used directly as a form of fertilizer.

In carrying out the process of this invention, the vaporous mixture of hydrogen chloride and nitric acid may be bubbled through a suitable scrubber or tower having contained therein a strong aqueous solution of calcium chloride. If desired, a plurality of scrubbers may be used in the process in order to insure that all of the nitric acid reacts with the calcium chloride. In accordance with one embodiment of this invention, the process may be made continuous by flowing the gases through a series of scrubbers or reaction towers in countercurrent flow relationship with the calcium chloride solution charged to the system.

An important aspect of this invention is the regulation and control of the strength of the calcium chloride solution through which the gases are passed and a further aspect of this invention is the control of the temperature at which the reaction is carried out. With respect to temperature conditions, the temperature should not be below about 115° C. or otherwise the final calcium nitrate solution withdrawn from the scrubbing system may contain an excess quantity of hydrogen chloride absorbed therein or otherwise the calcium nitrate solution withdrawn would contain appreciable amounts of calcium chloride. Accordingly, for a satisfactory commercial operation the temperature of the scrubbing or reaction zones should be above 115° C. On the other hand, the temperature should not be allowed to go in excess of about 170° C. since at about this temperature the equilibrium reaction for the formation of calcium nitrate from calcium chloride may have a tendency to shift toward the reverse reaction, thus resulting in the incomplete absorption of the nitric acid in the reaction or scrubbing zone. Thus the maximum temperature for the reaction is under ordinary conditions about 170° C. While 115 to 170° C. is indicated as the broad temperature range for effecting the desired absorption of nitric acid, there is a considerably narrower range which has been found to be most satisfactory in actual use. This preferred temperature range is between about 135 and about 150° C. It is preferred to operate within this narrower range since the characteristics of the initial aqueous calcium chloride solution and the final aqueous calcium nitrate solution, as well as the intermediate aqueous calcium chloride-calcium nitrate solutions, are such that they are more readily handled in the process within this narrower temperature range. Thus, a further aspect of this invention involves operating the nitric acid scrubbers within the preferred temperature range of 135° C. to 150° C. It will be apparent, however, that the temperatures to be employed may depend upon the pressures within the scrubbers. The above indicated temperature ranges are those preferred when operating at atmospheric pressure or under a slight vacuum.

The calcium chloride employed for absorbing the nitric acid from the gaseous mixture should be one which is sufficiently strong in order to rapidly absorb the nitric acid and to permit the ready conversion of the calcium chloride to calcium nitrate. It has been discovered that the inuitial calcium chloride solution charged to the system should contain at least 60% calcium chloride (anhydrous basis). This means that the initial water content of the strong solution introduced into the system should be adjusted so that it is not over about 40% by weight and so that the calcium chloride is converted to calcium nitrate the water content of the resulting solution is continuously maintained at a value less than about 40% by weight. On the other hand, the upper limit for the strength of the calcium chloride in the initial solution is about 90%. It has been found that this is largely determined by the ease with which calcium chloride solution can be pumped and circulated through the scrubbing or reaction zones. Thus the water content of the contacting solution containing various proportions of calcium chloride and calcium nitrate, depending upon the stage of the reaction, should not be less than about 10%. While as above indicated, the preferred water content of the contacting solution falls between about 10 and about 40% by weight, this composition may be deviated from somewhat by changing temperature conditions, by the amount of water which may be condensed in the reactors from the gases undergoing treatment, and by the change in the chemical composition of the solution incident to the conversion of the calcium chloride to calcium nitrate. The percentages of calcium chloride and calcium nitrate, as stated above, are, of course, expressed on the anhydrous basis.

In carrying out the process of this invention, it will be apparent that a number of different types of apparatus may be employed, also the process may be carried out batchwise or in accordance with a continuous method. By operating batchwise the gaseous mixture containing hydrogen chloride and nitric acid may be bubbled through a strong aqueous solution of calcium chloride until such time as substantially all of the calcium chloride has been converted to calcium nitrate or until such time as the gases escaping from the solution do not show any substantial depletion in the nitric acid content. However, in accordance with this invention, it is preferred to employ a continuous process which may be used in conjunction with a continuous process for the nitration of alkali metal chlorides. An apparatus which may be employed for carrying out such a continuous process is indicated schematically in the accompanying drawing. Inasmuch as the drawing is merely schematic to illustrate the method of effecting the over-all process, various details with respect to controls and auxiliary equipment have been omitted since these are within the skill of the art.

With reference to the drawing, there is provided a nitrator 2 and scrubbers or absorption zones 4, 6 and 8 connected in series. The nitrator is provided with a hopper 10 and a star wheel 12 for the continuous or intermittent introduction of an alkali metal chloride into the nitrator. A false bottom 14, which may comprise acid resistant Raschig rings supported on an acid resistant screen, is provided within the nitrator and serves as a support for the alkali metal chloride undergoing the nitration reaction. During nitration the alkali metal nitrate melt as formed at the temperature employed flows downwardly through the false bottom 14 to the lower portion of the nitrator 2 and out of the line 16 which is controlled by valve 18, or flows out of the bottom through a liquid seal arrangement.

Nitric acid for the nitration reaction is charged through line 20 to a vaporizer 22 and the resulting vapors are charged to the bottom of the nitrator 2 through the line 24. The nitrator is preferably provided with suitable heating means (not shown) for maintaining the temperature within the nitrator somewhat above the melting point of the metal nitrate being produced, and preferably between about 200° C. and about 400° C. The nitric acid vapors pass upwardly through the false bottom 14 and through the solid alkali metal chloride particles whereby the chloride is converted to a nitrate melt at the temperatures employed. The effluent gases resulting from the nitration step are discharged from an upper portion of the nitrator through a line 26 to the bottom of a scrubber or absorption zone 4, as will hereinafter be more fully described.

The process for the nitration of an alkali metal chloride as thus far described in connection with the drawing is known. By this process an alkali metal chloride, such as sodium chloride, potassium chloride, lithium chloride, Silvinite ore (a mixture of potassium and sodium chlorides), etc., may be readily nitrated to form the corresponding alkali metal nitrates or mixtures thereof. Under the usual operating conditions where a dilute nitric acid, for example, about 30%, is charged into the nitrator through the vaporizer, the effluent gas from the nitrator comprises essentially a mixture of hydrogen chloride, nitric acid and water vapors. However, if somewhat higher concentrations of nitric acid are employed in the charge, then there may also be present in the effluent gas from the nitrator some quantities of chlorine, nitrosyl chloride and perhaps oxides of nitrogen. In the description that follows, however, with respect to the removal of nitric acid from these effluent gases, it will be assumed that the gases passing from line 26 into the first scrubber or absorption zone 4 comprise essentially hydrogen chloride, nitric acid and water vapors. When a Silvinite ore is nitrated employing about 30% nitric acid at a temperature of 240°–300° C. the effluent gas may consist essentially of 13% by weight hydrogen chloride, 11% by weight nitric acid, with the balance being water vapor.

In accordance with one embodiment of this invention, the effluent gases from line 26 are passed into the bottom of absorption zone or scrubber 4 and bubbled upwardly through a solution containing calcium chloride and calcium nitrate, said solution being one that is partially spent of calcium chloride and which has been supplied from scrubber 6, it being understood that the gaseous mixture being treated and the calcium chloride treating solution are passed through the several scrubbers 4, 6 and 8 in countercurrent relationship. In scrubber 4 a portion of the nitric acid is absorbed in the calcium chloride solution and the treated gases having a somewhat depleted nitric acid content are removed from the top of the tower 4 through line 28 to the bottom of the reaction tower 6. Similarly the gases from line 28 are bubbled through a partially spent solution in the scrubber 6 and the thus treated gases are discharged from the top of the scrubber through line 30 and into the bottom of scrubber 8. Scrubber 8, being freshly charged with fresh calcium chloride make-up solution, serves substantially to remove all of the nitric acid from the gaseous mixture and the substantially nitric acid-free gas comprising essentially hydrogen chloride and water vapor is withdrawn from the top of scrubber 8 through line 32 to a condenser 34. In the condenser 34 the water vapor is condensed and the hydrogen chloride is adsorbed in the condensed water. The dilute hydrochloric acid flows into a receiver 36 from which it may be withdrawn through line 38 controlled by a valve 40. If desired, the receiver 36 may be connected to a suitable source of vacuum (not shown) through line 42 in order to provide a slight vacuum on the entire system. This may be desirable in order to prevent effluent gases from escaping from the nitrator 2 at the point at which the alkali metal chloride is introduced thereinto (e. g. through star wheel 12).

The fresh make-up strong calcium chloride solution containing 60 to 90% calcium chloride (or 10 to 40% water) is passed from line 44 through pump 46 and line 48 into the top of the scrubber 8 wherein it is employed to absorb last traces of nitric acid from the gas discharged from scrubber 6. The calcium chloride solution now containing some calcium nitrate may be recycled to the scrubber 8 through line 50 controlled by valve 52 and pump 46, or it may be cycled through line 54, pump 56 and line 58 to the top of scrubber 6. The calcium chloride solution having additional quantities of calcium nitrate dissolved therein may be recycled from a lower portion of scrubber 6 through line 60 controlled by valve 62 to pump 56, or it may be cycled to scrubber 4 through line 64, pump 66 and line 68. If substantially all of the calcium chloride is reacted in the solution reaching the bottom of scrubber 4, it may be withdrawn through lines 70 and 72 controlled by valve 74. This strong calcium nitrate solution may be further purified and employed as a fertilizer or in other industrial processes involving the use of calcium nitrate. If desired a portion of the solution withdrawn through line 70 may be recycled to the scrubber 4 through lines 76 and 78 controlled by valve 80 and pump 66.

The scrubbers or reaction zones 4, 6 and 8 may be of any desired type such as those generally employed for washing acidic gases with an aqueous solution. They may suitably be constructed of glass or other nonporous ceramic material or acid resistant refractories or alloys. These scrubbers or absorption zones may take the form of bubble towers or may take the form of towers which are partially or completely filled with acid resistant Raschig rings. They may also be provided with heating and/or cooling means (not shown) for controlling the temperature of the solution therein within the ranges specified in the foregoing, or heating or cooling means can be provided in the liquid circulating lines 68, 58, and 48. In the selection of particular types of scrubbers, pumps for circulating the strong solution, and other accessories, an important consideration is the fact that the solution may be very thick, thus necessitating the design of special equipment for its proper handling. Such equipment forms no part of this invention, however.

As above indicated, the calcium nitrate solution withdrawn from line 72 is suitable for use in many industrial applications, such as in the preparation of a suitable fertilizer. Likewise the dilute hydrochloric acid withdrawn from line 38 is commercially valuable. Where a 30% nitric acid is charged into the initial nitrator and the apparatus operated as indicated above, it has been discovered that a commercially satisfactory grade of dilute hydrochloric acid is recoverable from the receiver 36 through the discharge line 38. This acid has been found to contain about 19% by weight of hydrogen chloride. A small amount of free chlorine on the order of between 0.1 and 0.2 per cent may be present in this dilute hydrochloric acid. A typical analysis of the calcium nitrate solution discharged through line 72 from the scrubber 4 under the conditions indicated above was 70.7% calcium nitrate, 6.45% calcium chloride and 22.8% water.

Thus it has been shown that a new and efficient method has been provided for separating nitric acid from gaseous mixtures containing nitric acid and hydrogen chloride. The process is particularly useful in an alkali metal chloride nitration process where it is desired to make use of constituents of the effluent gases from the nitration reactor.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A process for the treatment of a mixture containing nitric acid and hydrogen chloride which comprises contacting said mixture in the vapor phase with a strong aqueous solution of calcium chloride containing from 10% to 40% of water by weight, at a temperature between about 115° C. and about 170° C. whereby to form calcium nitrate, and separating said calcium nitrate from unreacted hydrogen chloride.

2. A process for separating nitric acid from a mixture containing nitric acid and hydrogen chloride which comprises passing said mixture in the vapor phase through an elongated absorption zone containing an aqueous solution of calcium chloride having a water content of between about 10 and about 40% by weight maintained at a temperature between about 115° C. and about 170° C., and withdrawing from said absorption zone a gas depleted in nitric acid content containing substantial amounts of hydrogen chloride.

3. A process for the treatment of a mixture containing nitric acid and hydrogen chloride which comprises bubbling said mixture in the vapor phase through an elongated vertical absorption zone containing a strong aqueous solution of calcium chloride having a water content of between about 10% and 40% by weight, maintained at a temperature between about 115° C. and about 170° C. whereby to form a solution of calcium nitrate, and withdrawing a gaseous mixture substantially depleted in nitric acid content and containing hydrogen chloride from an upper portion of said absorption zone.

4. The process recited in claim 2 wherein said temperature is maintained between about 135° C. and about 150° C.

5. A nitration and effluent gas treatment process which comprises reacting nitric acid vapors with an alkali metal halide to form an alkali metal nitrate and an effluent gas containing substantial amounts of nitric acid and hydrogen chloride, contacting said effluent gas in the vapor state in a contact zone with a strong aqueous solution of calcium chloride containing from about 10% to about 40% of water by weight, at a temperature between about 115° C. and about 170° C. whereby the nitric acid is converted to calcium nitrate, and withdrawing unreacted hydrogen chloride as a gas from said contact zone.

6. The process recited in claim 5 wherein said temperature is maintained between about 135° C. and about 150° C.

7. A continuous process for separating nitric acid from a mixture containing nitric acid and hydrogen chloride which comprises continuously passing said mixture in the vapor state through an absorption zone, continuously passing a strong aqueous solution of calcium chloride containing from about 10% to about 40% of water by weight, through said absorption zone in countercurrent flow relationship to said mixture, withdrawing a strong aqueous solution containing calcium nitrate from said absorption zone, and separately withdrawing a gaseous mixture depleted in nitric acid content containing a substantial amount of hydrogen chloride from said absorption zone.

8. The continuous process recited in claim 7 wherein the reactants in the absorption zone are maintained at a temperature between about 135° C. and about 150° C. and wherein the water content of the aqueous solution is between about 10 and 40% by weight.

9. A continuous process for separating nitric acid from a mixture containing nitric acid, hydrogen chloride and water vapor which comprises continuously passing said mixture in a vapor state in one direction through a plurality of elongated absorption zones in series, continuously passing a strong aqueous solution of calcium chloride containing from about 10% to about 40% of water by weight, through said absorption zones in the reverse direction in series whereby countercurrent flow of mixture and solution is established, maintaining said absorption zones at a temperature between about 115° C. and about 170° C. whereby substantially all of said nitric acid is reacted with the calcium chloride in said solution, withdrawing a solution of calcium nitrate from the first absorption zone of said series, withdrawing a mixture of hydrogen chloride and water vapors substantially free of nitric acid from the last absorption zone of said series, and condensing said last mentioned mixture to form a dilute solution of hydrochloric acid.

10. A continuous process for separating nitric acid from a mixture containing nitric acid, hydrogen chloride and water vapor which comprises continuously passing said mixture in the vapor state into a lower portion of a first absorption zone, withdrawing vapors from an upper portion of said first absorption zone and passing them to a lower portion of a second absorption zone, withdrawing vapors from an upper portion of said second absorption zone substantially free from nitric acid, introducing an aqueous solution containing about 60 to about 90% by weight of calcium chloride into a upper portion of said second absorption zone, withdrawing solution from a lower portion of said second absorption zone and passing it to an upper portion of said first absorption zone, withdrawing a solution containing substantial amounts of calcium nitrate from a lower portion of said first absorption zone, whereby a countercurrent flow relationship between vapors and solution is established in said absorption zones, and condensing the vapors withdrawn from the upper portion of said second absorption zone to form a dilute solution of hydrogen chloride, the temperature in said absorption zones being maintained between about 135° C. and about 150° C.

11. In a process for separating nitric acid from a mixture containing nitric acid and hydrogen chloride, the step of contacting said mixture with a strong aqueous solution of calcium chloride containing from about 10% to about 40% of water by weight, maintained at a temperature between about 115° C. and 170° C.

12. In a process for separating nitric acid from a mixture containing nitric acid and hydrogen chloride, the step of contacting said mixture with an aqueous solution of calcium chloride containing between about 10 and about 40% by weight of water maintained at a temperature between about 135° C. and about 150° C.

LEONARD A. STENGEL.

REFERENCES CITED

The following references are of record in the file of this patent:

UNITED STATES PATENTS

| Number | Name | Date |
|---|---|---|
| 1,979,137 | Bartling | Oct. 30, 1934 |
| 2,269,000 | Beekhuis | Jan. 6, 1942 |
| 2,296,763 | Beekhuis | Sept. 22, 1942 |

FOREIGN PATENTS

| Number | Country | Date |
|---|---|---|
| 438,541 | Great Britain | Aug. 12, 1933 |

OTHER REFERENCES

Perry: "Chemical Engineer's Handbook," 2nd edition (1941), page 478. Published by McGraw-Hill Book Co., New York.